(12) United States Patent
Ahner et al.

(10) Patent No.: US 6,432,023 B1
(45) Date of Patent: Aug. 13, 2002

(54) DRIVE TRAIN ASSEMBLY FOR A MOTOR VEHICLE, AND METHOD FOR CONTROLLING THE OPERATION THEREOF

(75) Inventors: Peter Ahner, Boeblingen; Wolfgang Haas, Korntal-Muenchingen; Torsten Mangold, Backnang; Manfred Ackermann, Oppenweiler; Andreas Frank, Sindelfingen; Juergen Glauning, Steinheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/720,956
(22) PCT Filed: May 6, 2000
(86) PCT No.: PCT/DE00/01435
§ 371 (c)(1),
(2), (4) Date: Mar. 1, 2001
(87) PCT Pub. No.: WO00/68034
PCT Pub. Date: Nov. 16, 2000

(30) Foreign Application Priority Data

May 10, 1999 (DE) .......................................... 199 21 354

Feb. 16, 2000 (DE) .......................................... 100 06 861

(51) Int. Cl.$^7$ .......................... B60K 41/00; B60K 41/22
(52) U.S. Cl. ...................................................... 477/5
(58) Field of Search .......................... 477/3, 4, 5; 475/5

(56) References Cited

U.S. PATENT DOCUMENTS 5,845,731 A 12/1998 Buglione

FOREIGN PATENT DOCUMENTS

| DE | 37 37 192 A | 7/1988 |
| DE | 196 50 725 A | 6/1997 |
| DE | 198 38 853 A | 3/1999 |

*Primary Examiner*—Dirk Wright
(74) *Attorney, Agent, or Firm*—Michael J. Striker

(57) ABSTRACT

In a drive train assembly for a motor vehicle, which includes successively arranged an internal combustion engine, a starter clutch, an electrical machine a drive clutch, and an automatic transmission, preferably an automated manual transmission, a common double clutch positioner is assigned to the two clutches, which enables a selective setting of the applicable status (open or closed) of the clutches by assumption of a corresponding switching position.

12 Claims, 1 Drawing Sheet

DRIVE TRAIN ASSEMBLY FOR A MOTOR VEHICLE, AND METHOD FOR CONTROLLING THE OPERATION THEREOF

BACKGROUND OF THE INVENTION

The invention relates to a drive train assembly for a motor vehicle and to a method for controlling it.

From the prior art, drive train assemblies are known in which in succession an internal combustion engine, a starter clutch, an electrical machine, a drive clutch, and an automatic transmission, preferably an automated manual transmission, are disposed. The electrical machine can be used, among other purposes, as a starter-generator. Typically, the components listed are adapted to the various situations that occur during operation of the motor vehicle in a coordinated way in terms of their operating states. Usually, such control is effected via a central engine control unit, which specifies set-point variables to final control elements assigned to the various components of the drive train assembly. For instance, the starter clutch and the drive clutch have separate clutch positioners, with which a status (open or closed) of the clutches can be set selectively. Reducing the number of parts in the components present in the drive train assembly is a goal for manifold reasons. On the one hand, fewer parts means reduced material costs and reduced effort and expense for assembly, so that production costs can be reduced. On the other hand, the attendant space saving makes it possible to optimize the installation space, and the reduced weight then reduces fuel consumption on the part of the motor vehicle.

SUMMARY OF THE INVENTION

An additional reduction in the number of parts is possible as a result of the drive train assembly according to the invention and the method for controlling its operation. Because a common double clutch positioner is assigned to the two clutches, which enables a selective setting of the applicable status (open or closed) of the clutches by assumption of a corresponding switching position, one of the two usual clutch positioners can be dispensed with.

In a preferred embodiment of the invention, a control unit for specifying the switching positions is assigned to the double clutch positioner. The specification of the switching positions is effected as a function of the operating states and/or operating parameters of the assemblies present in the motor vehicle. In many operating situations, recourse can be had to time-tested control mechanisms.

The double clutch positioner preferably has up to four switching positions, whose location can be defined by the specification of different disengagement paths for the double clutch positioner, in which both clutches are closed (coupling status Z1), or the starter clutch is open and the drive clutch is closed (coupling status Z2), or both clutches are open (coupling status Z3), or the starter clutch is closed and the drive clutch is open (coupling status Z4).

In a further preferred embodiment of the invention, only three switching positions in the double clutch positioner are implemented, and either the aforementioned clutch status Z3 or the clutch status Z4 is dispensed with. In operating situations of the motor vehicle in which the aforementioned clutch statuses would be necessary, this is compensated for by a control of the operating states of the assemblies present in the motor vehicle. To that end, it is for instance possible, via the control unit, to actuate means with which the manual transmission can be shifted into a neutral position.

The present invention furthermore discloses especially preferred embodiments for the case where the clutch status Z4 is dispensed with. In at least the following operating situations, starting of the engine;

the shifting operation in the transmission;

a static mode of the engine; and hard braking, for example ABS braking, with drive effected via the engine, the missing clutch status Z4 is compensated for in that the clutch status Z1 and a neutral position of the transmission are set. To change gears, the transmission must be shifted without load and synchronized by means of controlling the engine and the electrical machine. It is also preferred that with the clutch status Z4 dispensed with, the startup of the motor vehicle be designed such that the clutch status Z1 and a gear are selected in the transmission, and the drive takes place via a sliding starter clutch.

In a further preferred embodiment of the invention, in which the clutch status Z3 has been dispensed with, a pulsed start of the engine can be realized by providing that at least intermittently, the clutch status Z2 and the neutral position of the transmission are specified to the double clutch positioner. If the clutch status Z3 is dispensed with, hard braking, such as ABS braking, with drive via the electrical machine, can be designed such that shifting is done first into the clutch status Z1 and then into the clutch status Z4. The closure of the clutch K2 can be delayed via additional elements, until the status Z1 is attained.

BRIEF DESCRIPTION OF THE DRAWINGS

The invention will be described in further detail below in terms of exemplary embodiments in conjunction with the associated drawings. Shown are.

DESCRIPTION OF THE PREFERRED EMBODIMENTS

Figure 1:
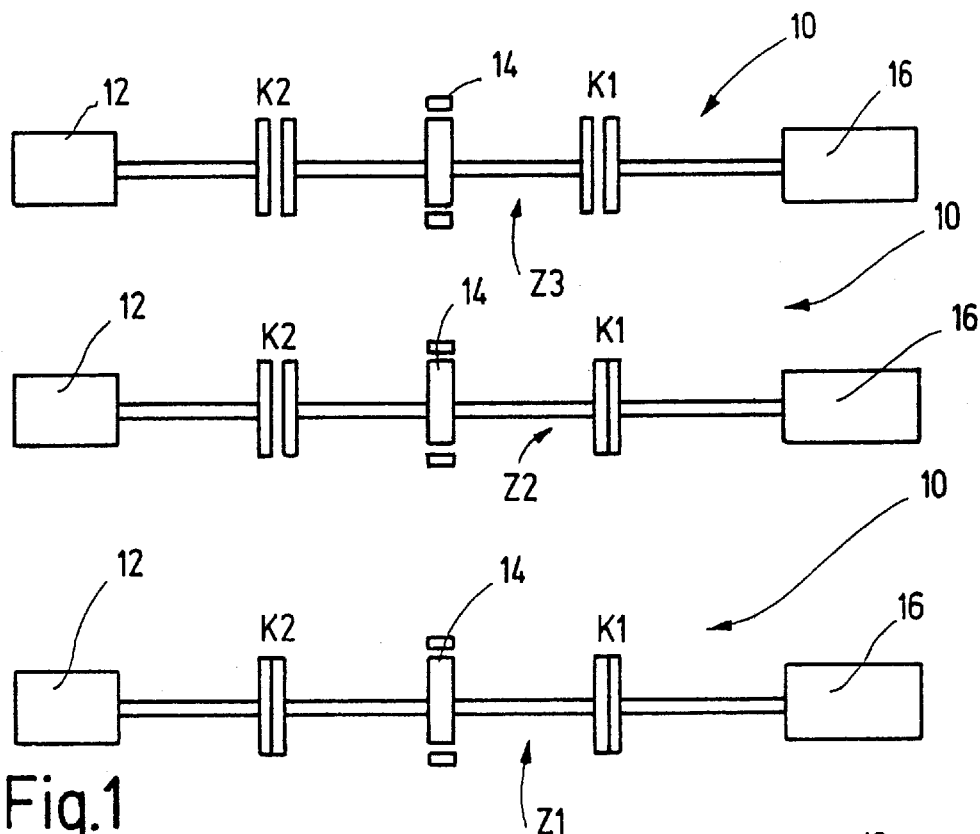
FIG. 1, a first variant for a drive train assembly, which has a double clutch positioner with three switching positions.
Figure 2:
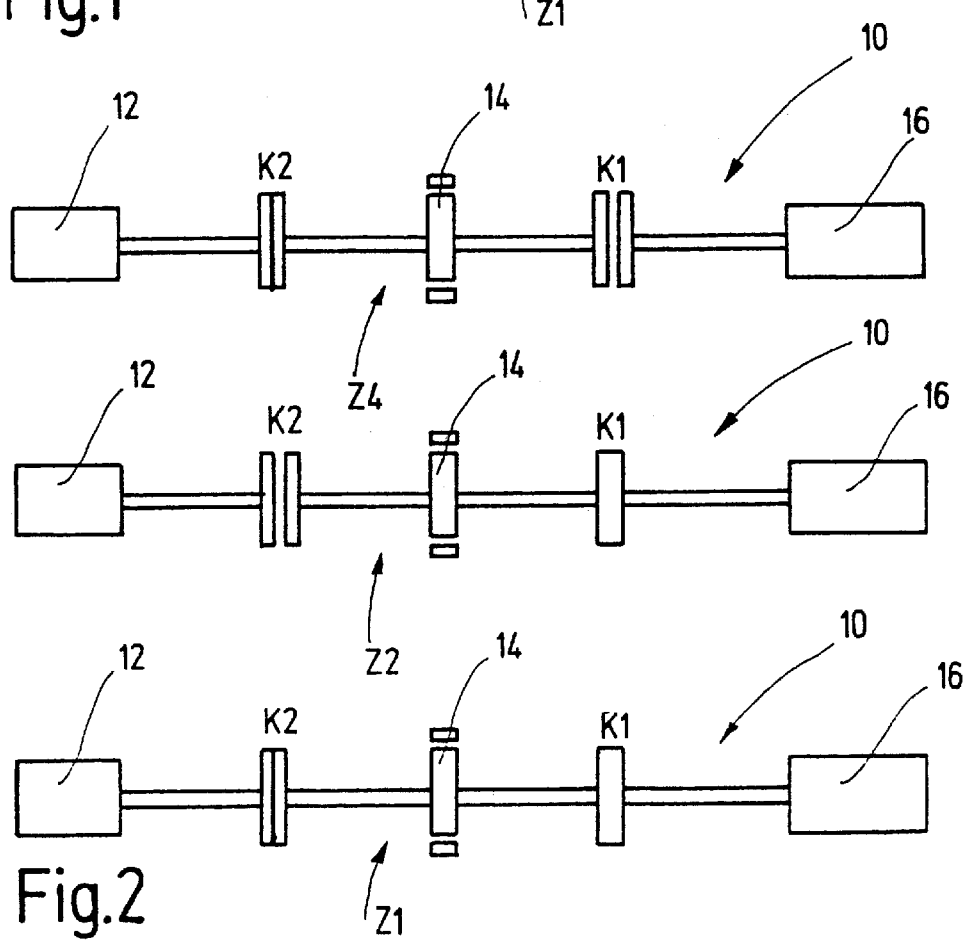
FIG. 2, a second variant for this kind of double clutch positioner, with three switching positions.

In FIGS. 1 and 2, drive train assemblies 10 for a motor vehicle are shown schematically. The drive train assembly 10 includes, among other elements, in succession an internal combustion engine 12, a starter clutch K2, an electrical machine 14, a drive clutch K1, and an automatic, preferably automated manual transmission 16. The electrical machine 14 can be designed as a starter-generator and in that case, with the starter clutch K2 closed, transmits a torque required to start the engine 12. The electrical machine 14 can also be designed as an asynchronous machine and optionally used to drive the motor vehicle and to recharge a battery. The required means or control sequences for defining such functionalities are well known and will therefore not be described further at this point.

For the sake of simplicity, no attempt has been made, either, to show a control unit (engine control unit) that can be used to coordinate the components of the drive train assembly 10. By way of such a control unit, the operating states and/or operating parameters of the various components of the drive train assembly 10 can be varied, by the specification of suitable set-point variables to final control elements assigned to the various components. Especially the two clutches K1, K2 can be actuated by a common double clutch positioner, not shown. An actuation of the clutches K1, K2 leads to a respective change in the status of each of the clutches K1, K2. The status is then either "open" or "closed".

The double clutch positioner should have a maximum of four switching positions, between which shifting can be done, for instance by the specification of different disengagement paths. The possible switching positions are as follows:

both clutches K1, K2 are closed (coupling status Z1),
the starter clutch K2 is open and the drive clutch K1 is closed (coupling status Z2),
both clutches K1, K2 are open (coupling status Z3); and
the starter clutch K2 is closed and the drive clutch K1 is open (coupling status Z4).

Theoretically, all four clutch statuses Z1, Z2, Z3, Z4 are needed to control the operation of the motor vehicle. In the variants 1 and 2 shown in FIGS. 1 and 2, however, one of the clutch statuses Z3 or Z4 can be dispensed with in each case.

Via the control unit, the switching position to be set can be specified to the double clutch positioner. This specification is done as a function of the operating states and/or operation parameters of the assemblies present in the motor vehicle. Thus the prevailing peripheral conditions can be addressed flexibly in accordance with the operating situation, and a starting event, for instance, of the engine 12 or a startup of the motor vehicle can be controlled.

In variant 1 shown in FIG. 1, the clutch status Z4, in which the starter clutch K2 is closed and the drive clutch K1 is open, is dispensed with. At least in the following operating situations, it is then necessary, via the control unit, to make interventions into the operating states and/or parameters of the components of the drive train assembly 10:

starting phase of the engine 12;
a shifting operation in the manual transmission 16;
a static mode of the engine 12; and
hard braking, for example ABS braking, with drive effected via the engine 12.

In the cases listed, the clutch status Z1 is specified to the double clutch positioner on the one hand and a neutral position N in the manual transmission 16 on the other are now specified by means of the control unit. In this way, the manual transmission 16 and the assemblies following it can be decoupled, for instance during the starting operation.

If the clutch status Z4 is dispensed with, then startup of the motor vehicle can be controlled such that the clutch status Z1 is set, a gear in the manual transmission 16 is specified, and the startup is effected via a sliding starter clutch K2. Optionally, an rpm adaptation of the engine 12 must be performed, for instance in order to assure a minimum rpm or to make an ensuing gear synchronization easier.

In the variant shown in FIG. 2, the clutch status Z3 has been dispensed with, in which both clutches K1, K2 are open. In the event that a pulsed start of the engine 12 is to be performed, then at least intermittently the clutch status Z2 and a neutral position N of the manual transmission 16 must be specified.

If ABS braking is done while clutch status Z3 is dispensed with and driving is effected via the electrical machine 14, then a transition must be made from the clutch status Z1 to the clutch status Z4, before the drive clutch K1 can be opened in order to decouple the inertias of the engine 12 and of the electrical machine 14. At the onset of hard braking, for example the ABS braking, not only the inertia in the drive train but also a surge in moment upon starting of the engine 12 have an effect. The closure of the starter clutch K2 can be delayed optionally by means of suitable additional elements, such as a damper that switches over on its own.

What is claimed is:

1. A drive assembly for a motor vehicle, comprising an internal combustion engine; a starter clutch; an electrical machine; a drive clutch; an automatic transmission all disposed in succession; and a common double clutch positioner assigned to said clutches and enabling a selective setting of an applicable status selected from the group consisting of an open status and a closed status of said clutches by assumption of a corresponding switching position.

2. A drive assembly as defined in claim 1; and further comprising a control unit for specifying the switching positions and assigned to said double clutch positioner, so that a specification of the switching positions is effective as a function of items selected from the group consisting of operating states, operating parameters, and both of assemblies present in the motor vehicle.

3. A drive assembly as defined in claim 1; and further comprising means actuatable with said control unit and shifting said transmission which is formed as a manual transmission into a neutral position.

4. A drive assembly as defined in claim 1, wherein said electrical machine is a startergenerator.

5. A method for controlling an operation of a motor vehicle having a drive train assembly which includes in succession an internal combustion engine, a starterclutch, an electrical machine, a drive clutch, and an automated manual transmission, the method comprising the steps of providing a common double clutch positioner assigned to said clutches; and setting of an applicable status selected from the group consisting of an open status or a closed status of said clutches by assumption of a predeterminable switching position in said double clutch positioner.

6. A method as defined in claim 5; and further comprising effecting a specification of the switching positions as a function of items selected from the group consisting of operator states, operating parameters and both of assemblies present in the motor vehicle.

7. A method as defined in claim 6; and further comprising defining up to four switching positions by the specification of different disengaging paths for the double clutch positioner, in which both clutches are closed to assume a coupling status, or the starter clutch is open and the drive clutch is closed to assume another coupling status, or both clutches are open to assume a further coupling status, or the start clutch is closed and the drive clutch is open to assume still a further coupling status.

8. A method as defined in claim 7; and further comprising implementing only three switching positions in the double clutch positioner, while one switching position for the further coupling status or for the still further coupling status is emitted; and compensating the emitted switching position by a control of the operating states of the assemblies present in the motor vehicle.

9. A method as defined in claim 8; and further comprising using the double clutch positioner without the still further coupling status in at least the operational situations including a starting of the engine, a shifting operation in the transmission, a static mode of the engine, a hard braking with drive effected via the engine, and a first mentioned clutch status and a neutral position of the transmission are set.

10. A method as defined in claim 8; and further comprising, if the double clutch positioner is used without the still further clutch status, occurring a startup of the motor vehicle in the first mentioned closing status with a gear selected in the transmission and via a sliding starter clutch.

11. A method as defined in claim 8; and further comprising if the double clutch positioner is used without the further closing status, enabling a pulsed start of the engine by an at least intermittent setting of the other closing status and a neutral position of the transmission.

12. A method as defined in claim 8; and further comprising, if a double clutch positioner is used without the further closing status, executing hard braking in operation via the electrical machine in such a way that shifting is done first to the first mentioned closing status, and then to the still further closing status.

* * * * *